US010445240B2

(12) United States Patent
Giri et al.

(10) Patent No.: US 10,445,240 B2
(45) Date of Patent: Oct. 15, 2019

(54) BUS-BASED CACHE ARCHITECTURE

(71) Applicant: Analog Devices Global Unlimited Company, Hamilton (BM)

(72) Inventors: Abhijit Giri, Bangalore (IN); Saurbh Srivastava, Bangalore (IN); Michael S. Allen, Needham, MA (US)

(73) Assignee: ANALOG DEVICES GLOBAL UNLIMITED COMPANY, Hamilton (BM)

( * ) Notice: Subject to any disclaimer, the term of this patent is extended or adjusted under 35 U.S.C. 154(b) by 229 days.

(21) Appl. No.: 14/450,145

(22) Filed: Aug. 1, 2014

(65) Prior Publication Data

US 2016/0034399 A1 Feb. 4, 2016

(51) Int. Cl.
*G06F 12/0846* (2016.01)

(52) U.S. Cl.
CPC .. *G06F 12/0848* (2013.01); *G06F 2212/1024* (2013.01)

(58) Field of Classification Search
CPC .... G06F 3/066; G06F 3/0611; G06F 12/0846; G06F 12/0851; G06F 12/0853; G06F 12/0857; G06F 12/0859; G06F 12/0873; G06F 12/0875
See application file for complete search history.

(56) References Cited

U.S. PATENT DOCUMENTS

| 5,968,167 A * | 10/1999 | Whittaker | G06F 9/3851 712/225 |
| 6,775,752 B1 * | 8/2004 | Bhatia | G06F 9/383 365/189.04 |
| 2004/0088489 A1 * | 5/2004 | Hironaka | G06F 9/3802 711/131 |

(Continued)

FOREIGN PATENT DOCUMENTS

WO WO-2013101092 A1 * 7/2013 ........... G06F 15/167

OTHER PUBLICATIONS

Zhaomin Zhu et al., "A Novel Hierarchical Multi-port Cache", Sep. 16-18, 2003, Solid-State Circuits Conference, 2003. ESSCIRC '03. Proceedings of 29$^{th}$ European, IEEE, ISBN: 0-7803-7995-0, 6 pages.

(Continued)

*Primary Examiner* — Ann J Lo
*Assistant Examiner* — Leandro R Villanueva
(74) *Attorney, Agent, or Firm* — Patent Capital Group

(57) ABSTRACT

Digital signal processors often operate on two operands per instruction, and it is desirable to retrieve both operands in one cycle. Some data caches connect to the processor over two busses and internally uses two or more memory banks to store cache lines. The allocation of cache lines to specific banks is based on the address that the cache line is associated. When two memory accesses map to the same memory bank, fetching the operands incurs extra latency because the (Continued)

accesses are serialized. An improved bank organization for providing conflict-free dual-data cache access—a bus-based data cache system having two data buses and two memory banks—is disclosed. Each memory bank works as a default memory bank for the corresponding data bus. As long as the two values of data being accessed belong to two separate data sets assigned to the two respective data buses, memory bank conflicts are avoided.

20 Claims, 11 Drawing Sheets

(56) References Cited

U.S. PATENT DOCUMENTS

| | | | | |
|---|---|---|---|---|
| 2007/0136536 A1* | 6/2007 | Byun | ............... | G06F 9/4405 711/149 |
| 2009/0083479 A1* | 3/2009 | Lee | ............... | G11C 7/1075 711/106 |
| 2014/0052914 A1* | 2/2014 | Wang | ............... | G06F 12/0846 711/119 |
| 2014/0143508 A1* | 5/2014 | Kwon | ............... | G06F 12/00 711/147 |

OTHER PUBLICATIONS

E.F. Torres et al., "Contents Management in First-Level Multibanked Data Caches", 10$^{th}$ International Euro-Par Conference, Pisa, Italy, Aug. 31-Sep. 3, 2004, ISBN: 978-3-540-22924-7, 12 pages.

Toni Juan et al., "Data Caches for Superscaler Processors", © 1997 ACM 0-89791-902-5/97/7. . . $3.50, ICS 97 Vienna Austria, 8 pages.

Jude A. Rivers et al., "On High-Bandwidth Data Cache Design for Multi-Issue Processor", © 1997 IEEE, Published in the Proceedings of Micro-30, Dec. 1-3, 1997 in Research Triangle Park, NC, 11 pages.

E.F. Torres et al., "Store Buffer Design in First-Level Multibanked Data Caches", © 2005 IEEE, 0-7695-2270-X/05/$20.00, 12 pages.

"TMS320C64x DSP Two-Level Internal Memory Reference Guide", Literature No. SPRU610C, Feb. 2006, © Texas Instruments, Inc., 85 pages.

Koh Johguchi et al., "Unified Data/Instruction Cache with Bank-Based Mutli-Port Architecture", Circuits and Systems, 2006, APC-CAS 2006, IEEE Asia Pacific Conference, Dec. 4-7, 2006, ISBN: 1-4244-0387-1, 5 pages.

\* cited by examiner

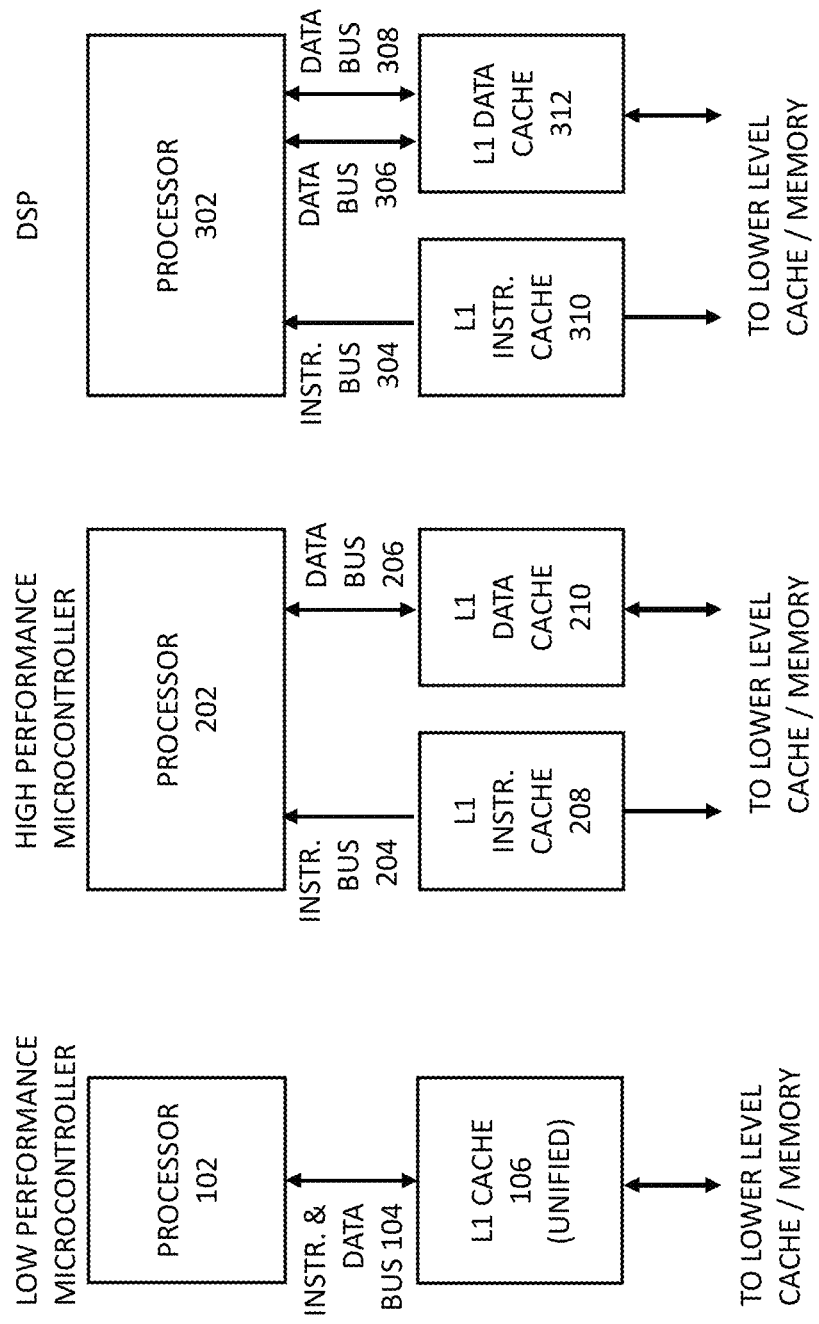

BUS-BASED CACHE ARCHITECTURE

TECHNICAL FIELD OF THE DISCLOSURE

The present invention relates to the field of computer processors, in particular to memory architectures for computer processors.

BACKGROUND

Modern computer systems usually includes one or more processors, one or more memory systems, and input/output mechanisms. A processor typically needs to access the memory system for instructions and data to perform operations. When evaluating the performance of a computer system, it is important to factor in the number of cycles needed to access instructions and data from memory, i.e., latency, because the number of cycles needed to access instructions and data from memory can directly affect the total number of cycles it takes to perform an instruction.

To alleviate the adverse impact on performance from the long latency associated with accessing main memory (e.g., random access memory (RAM)), a memory system can include multiple levels of cache memory, e.g., L1, L2, L3, etc. A cache memory is a smaller but faster memory which stores copies of data for frequently accessed main memory locations. L1 or Level-1 cache is the closest component of the memory system to the processor, which can typically return data for a memory access in one cycle. The lower levels of memory (e.g., L2, L3, main memory, and so forth) typically have longer latency than L1 memory. When the processor can fetch instructions or data from cache memory instead of from main memory for at least some of the memory accesses, the overall average latency to access memory can be significantly decreased and the performance of the computer system can be improved.

Overview

Digital signal processors often operate on two operands per instruction. For the best performance, it is desirable for the processor to retrieve both operands in one cycle. Conventional caches for digital signal processors connect to the processor over two busses and internally, it typically uses two or more memory banks to store cache lines. The allocation of cache lines to specific banks is based on the address of the data that the cache line is associated. In other words, the address of the operands eventually determines which bank within the cache they will have to be fetched from. With this architecture, the cache is able to cater to the need of servicing two access requests in a single cycle in some to most of the cases. However, if the two memory accesses map to the same memory bank, fetching the operands incurs extra latency because the accesses are serialized. The present disclosure describes an improved bank organization for providing conflict-free dual-data cache access—a bus-based data cache system having two data buses and two memory banks. Each memory bank works as a default memory bank for the corresponding data bus. As long as the two values of data being accessed belong to two separate data sets assigned to the two respective data buses, memory bank conflicts can be avoided.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which:

FIG. 1 shows a typical memory architecture for a low performance microcontroller;

FIG. 2 shows a typical memory architecture for a high performance microcontroller;

FIG. 3A shows a typical memory architecture for a digital signal processor;

DESCRIPTION OF EXAMPLE EMBODIMENTS OF THE DISCLOSURE

Overview of Typical Memory Architectures

Figure 3B:
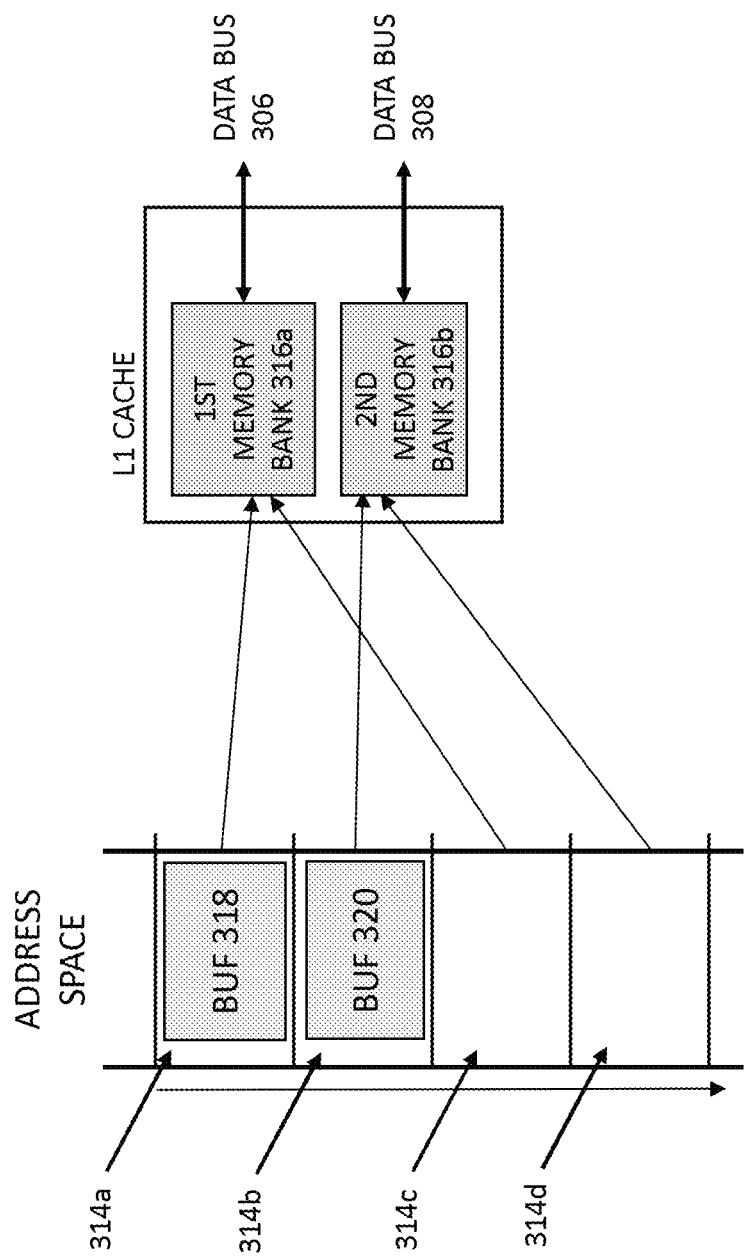
FIG. 3B illustrates allocation of cache lines to memory banks and serving two memory accesses in a single cycle in conventional data caches.

Memory systems provide an essential function to processors: fetching, providing, and storing of instructions and data. The interaction between processors and memory systems is an important part of performance, since operations are almost always going to require using the memory system. Typically, a unified memory is provided to store data and instructions—a single entity supporting a unified address space. To increase performance, memory systems include cache memory, which is a higher level of memory aiming to improve the average speed of memory accesses. (The unified memory beneath the cache memory is typically referred to as "lower level memory"). Various cache memory architectures exist for memory systems having differences in size, complexity, and performance. Organization and features of cache systems have evolved over time as demands of processing grew. For instance, the number of buses (supporting simultaneous access to instruction and data) that the processor uses to connect to the memory system has increased.

FIG. 1 shows a typical memory architecture for a low performance microcontroller. For a simple processor (e.g., a microcontroller), it is common for the microprocessor to access both instructions and data from the memory system over one bus. In the example shown, a processor 102 uses an instruction and data bus 104 to access the memory system, i.e., the L1 cache 106 and any lower level memories. Because both instruction and data are stored in the same memory system (including the L1 cache 106), the L1 cache 106 is called a "unified" cache. To manage memory accesses to the L1 cache 106 and lower level memories, a cache controller can be provided as part of the memory system. Typically, cache controllers can serve replies to the processor from the appropriate level of memory in response to memory accesses.

As time went on and demands for performance increased, newer computer architectures (e.g., the Harvard architecture) was introduced where the computer system utilizes separate storage and signal pathways for instructions and data. FIG. 2 shows a typical memory architecture for a high performance microcontroller. In the arrangement shown, a processor 202 may access an L1 instruction cache 208 via instruction bus 204 and access an L1 data cache 210 via data bus 206. In some cases, a unified cache is provided at L2 level. For most microcontrollers, the data access requirement is usually one data value per instruction. Therefore, having one data bus connected to the data cache provides optimum data access bandwidth enabling execution of one instruction per cycle if the instruction and data are cached.

For processors which are specialized in more complex operations than microcontrollers, the data access bandwidth requirement is greater. For instance, digital signal processor (DSP) can operate on two data values per instruction very frequently. Therefore, optimum memory access bandwidth can require one instruction bus and two data buses to support simultaneous access to the instruction and two data values to perform one instruction. FIG. 3A shows a typical memory architecture for a digital signal processor. The processor 302 (e.g., a DSP) may access data memory over two busses. Specifically, processor 302 accesses an L1 instruction cache 310 via instruction bus 304, accesses L1 data cache 312 via data bus 306 and data bus 308. Two data buses are employed to access two values of data since many DSP kernels (e.g., for performing Finite Impulse Response (FIR), Infinite Impulse Response (IIR), Fast Fourier Transform (FFT)) can benefit from accessing two data values (e.g., operands for an instruction) in a single cycle.

Different implementation techniques may be used for supporting two buses out of the cache. Since area and power cost for true multi-ported memory is significantly high, internally, the cache may actually employ many small single-ported memories (memory banks or sub-banks) to provide effectively multi-ported performance. The address range is partitioned in to pages (using certain bit(s) in the memory address) and pages are allocated to specific banks by hardware, e.g., by a cache controller. In other words, for each memory address in the address range, there is a corresponding bank dedicated to caching data for that memory address. A cache controller for this architecture can provide an additional functionality to serve memory accesses from the appropriate bank and cache data in the appropriate bank according to the memory addresses of the memory accesses. The banks are dedicated to caching data for cache lines in those pages. FIG. 3B illustrates allocation of cache lines to memory banks and serving two memory accesses in a single cycle in conventional data caches. Conventional caches for digital signal processors connect to the processor over two busses and internally, it typically uses two or more memory banks to store cache lines. The exemplary L1 cache has two data buses: data bus 306 and data bus 308 (following the architecture shown in FIG. 3A). Furthermore, the exemplary L1 cache includes two memory banks: $1^{st}$ memory bank 316a and $2^{nd}$ memory bank 316b for storing cache lines associated with (or allocated to) those memory banks. The allocation of cache lines to specific banks is based on the address of the data that the cache line is associated.

The exemplary address space shown in FIG. 3B is divided up into 8 Megabytes sections 314a-d (the address space can include further sections, or in some cases, the address space is divided up in a different manner). The cache lines in section 314a and cache lines in section 314c are mapped to the $1^{st}$ memory bank 316a; the cache lines in section 314b and cache lines in section 316d are mapped to the $2^{nd}$ memory bank 316b. In other words, the address of the operands eventually determines which bank within the cache they will have to be fetched from. Consider data buffer 318 and data buffer 320 being cached using this architecture, a first access request to data in buffer 318 (over data bus 306) and a second access request to data in buffer 320 (over data bus 308) can be served in one data cycle because the cache lines associated with buffer 318 are allocated to the $1^{st}$ memory bank 316a and the cache lines associated with buffer 320 are allocated to the $2^{nd}$ memory bank 316b. This can always be true, for instance, when the data buffers are aligned with the boundaries of sections 314a and 314b. In this manner, $1^{st}$ memory bank and the $2^{nd}$ memory bank can serve the two data accesses in one cycle. With this architecture, the cache is able to cater to the need of servicing two access requests in a single cycle in some to most of the cases (i.e., when the data buffers are aligned properly in the address space).

Figure 3C:
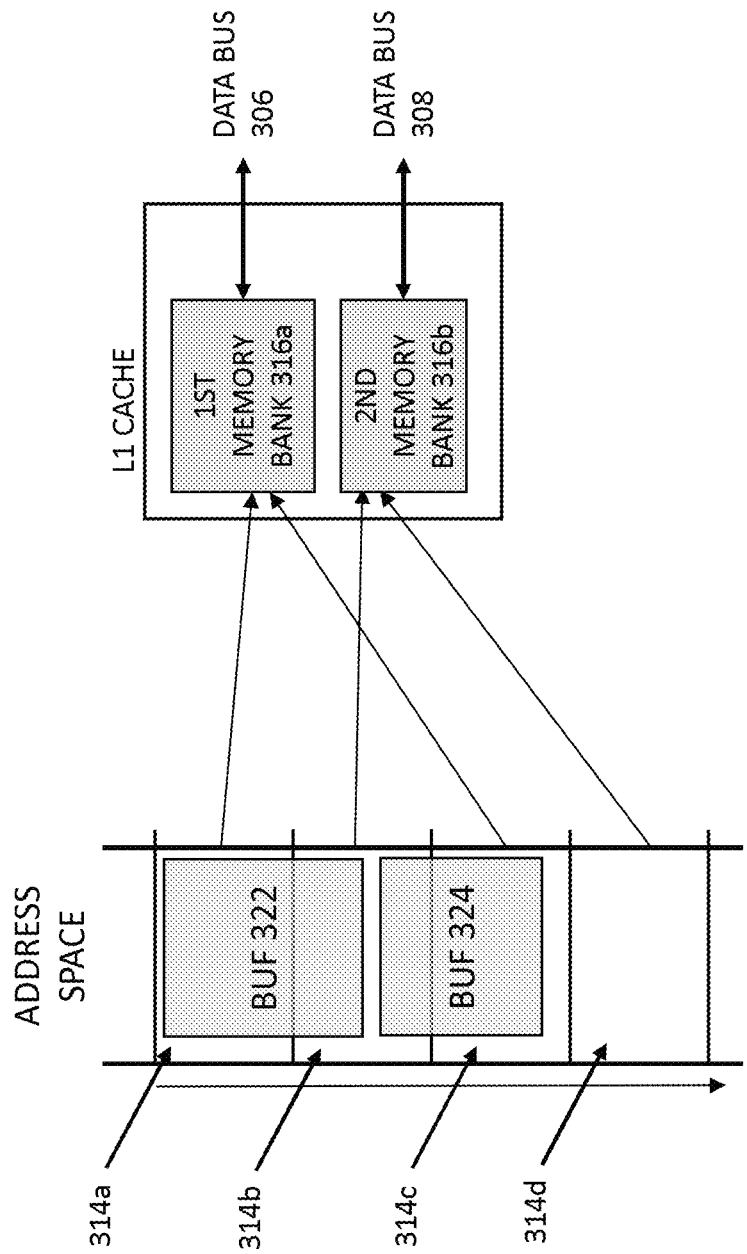
FIG. 3C illustrates allocation of cache lines to memory banks and serializing memory accesses in conventional data caches.

It is possible that data buffers in the address space are not aligned to the boundaries of the sections 314a-d. FIG. 3C illustrates allocation of cache lines to memory banks and serializing memory accesses in conventional data caches. Similar to the allocation shown in FIG. 3B, the cache lines in section 314a and cache lines in section 314c are mapped to the $1^{st}$ memory bank 316a; the cache lines in section 314b and cache lines in section 316d are mapped to the $2^{nd}$ memory bank 316b. However, in this example, data buffer 322 and data buffer 324 are not aligned to the boundaries of sections 314a-d. Note that some cache lines for caching a portion of data buffer 322 is in section 314b and some cache lines for caching a portion of data buffer 324 is in section 314b. If the two memory accesses over the respective data bus 306 and data bus 308 both fetch data in section 314b, the two memory accesses cannot be served in a single cycle because the two memory accesses are mapped to the same memory bank ($2^{nd}$ memory bank 316b). If the two memory accesses map to the same memory bank (referred herein as a "conflict"), fetching the operands incurs extra latency because the accesses are serialized. Furthermore, note that some cache lines for caching a portion of data buffer 322 is in section 314a and some cache lines for caching a portion of data buffer 324 is in section 314c. If the two memory accesses over the respective data bus 306 and data bus 308 fetch data in section 314a and section 314c respectively, the two memory accesses cannot be served in a single cycle because the two memory accesses are mapped to the same memory bank ($1^{st}$ memory bank 316b). In other words, a conflict occurs and the two memory accesses are serialized.

Generally speaking, when the processor 302 attempts to access data from memory, it is possible that the memory addresses of the data accesses over the data bus 306 and data bus 308 respectively can map to the same bank, thereby resulting in a conflict. Such conflicts are detected by the cache controller hardware and accesses are serialized. In cases of memory bank conflicts, the number of cycles needed to fetch data is increased (i.e., resulting in longer latency). Higher number of banks can reduce chances of memory bank conflicts between two data busses while compromising area and power efficiency. To avoid memory bank conflicts, a programmer can try to organize/align data sets (e.g., data buffers, collection of data values in the memory, data structures) in the memory space according to how the pages are allocated to banks to ensure that two data accesses from those data sets do not map to the same bank. But such a constraint can lead to inefficient use of the memory space, and the constraint can be cumbersome for the programmer.

Improved Memory System: Bus-Based Cache Memory System for Dual-Data Cache Access The present disclosure describes a bus-based cache architecture, which continues to provide a separate instruction bus, and two (or more) data buses for optimal performance and data bandwidth from memory. A processor can still fetch the instruction and two data values in a single cycle (if the instruction and data values are cached). However, instead of dividing the memory space into pages and allocating the pages to certain (default) memory banks, the bus-based cache memory system provides a default memory bank for each bus. The default memory banks are dedicated to providing caching functionality to their respective buses. In other words, the memory banks are no longer assigned to certain memory addresses or pages of the memory space, a memory bank is assigned to a particular bus in the bus-based cache architecture.

Figure 4:
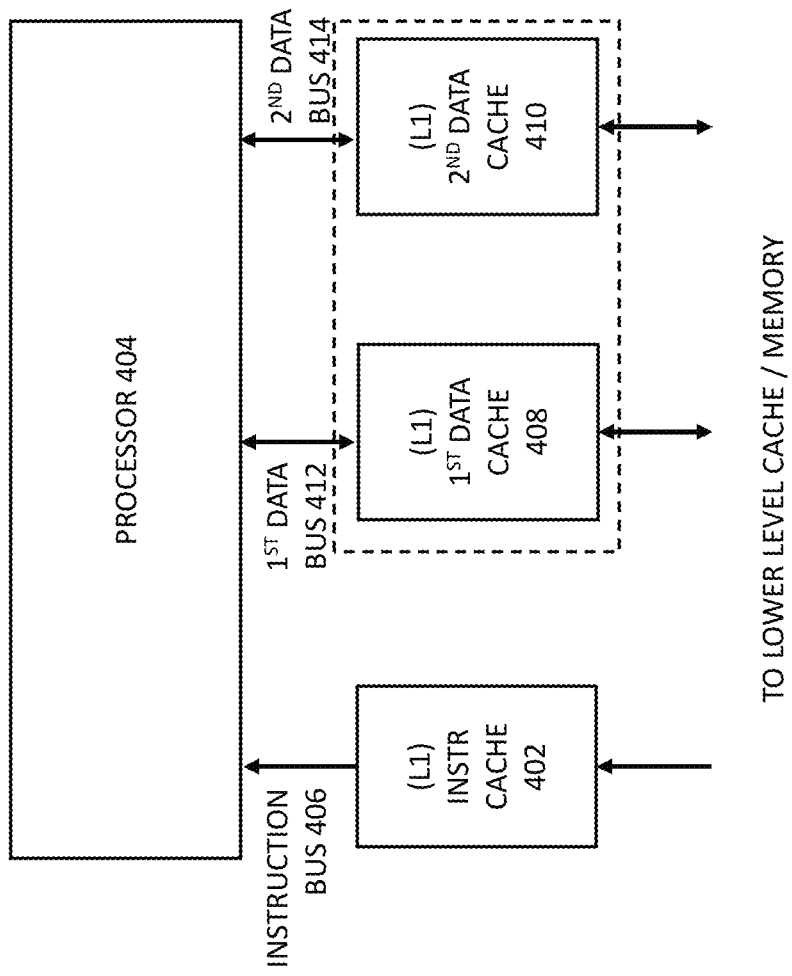
FIG. 4 show an exemplary bus-based data cache system for a processor, according to some embodiments of the disclosure.

FIG. 4 show an exemplary bus-based data cache system for a processor, according to some embodiments of the disclosure. The memory system can include one (L1) instruction cache 402 connected to the processor 404 over instruction bus 406, two data caches ((L1) first data cache 408 and (L1) second data cache 410) connected to the processor over two respective data buses (first data bus 412 and second data bus 414). While the instruction bus 406 and instruction cache 402 are not the focus of the present disclosure, it is noted that the instruction bus 406 receives instruction memory accesses from the processor 404 and returns instructions to the processor 404 in response to the instruction memory accesses; the instruction cache 402 caches frequently requested instructions and provides them to the processor. The first data cache 408 is the default cache for the first data bus 412; for data memory accesses received over the first data bus 412, a first memory bank of the first data cache 408 serves as the default memory bank for those data accesses. The second data cache 410 is the default cache for the second data bus 414; for data memory accesses received over the second data bus 414, a second memory bank of the second data cache 410 serves as the default memory bank for those data accesses. The memory system no longer assigns a default bank based on address bit(s) of the data memory accesses.

In most cases, the first data cache 408 operates independently from the second data cache 410, each cache aiming to serve the first data bus 412 and the second data bus 414 respectively. Data accesses received over the first data bus 412 are, by default, served by the first data cache 408. Data accesses received over the second data bus 414 are, by default, served by the second data cache 410. Later sections will describe certain situations where the first data cache 408 and the second data cache 410 cooperate in maintaining data coherence.

It is noted that although the present disclosure describes the improved bus-based architecture as having a first data cache 408 and a second data cache 410 for providing bus-based allocation of cache lines (each data cache catering primarily to one of the first data bus 412 and the second data bus 414 and each having one underlying memory bank), the improved bus-based architecture can also be viewed as a unified data cache (denoted by the box having a dotted line), which includes two busses and has two underlying memory banks to store cache lines—with the distinguished feature of bus-based allocation of cache lines to the banks. The two views of the bus-based architecture, i.e., (1) having two data caches, each with one underlying memory bank, and (2) having a unified data cache with two underlying memory banks, are considered equivalent.

Detailed View of the Bus-Based Cache Memory System

Figure 5:
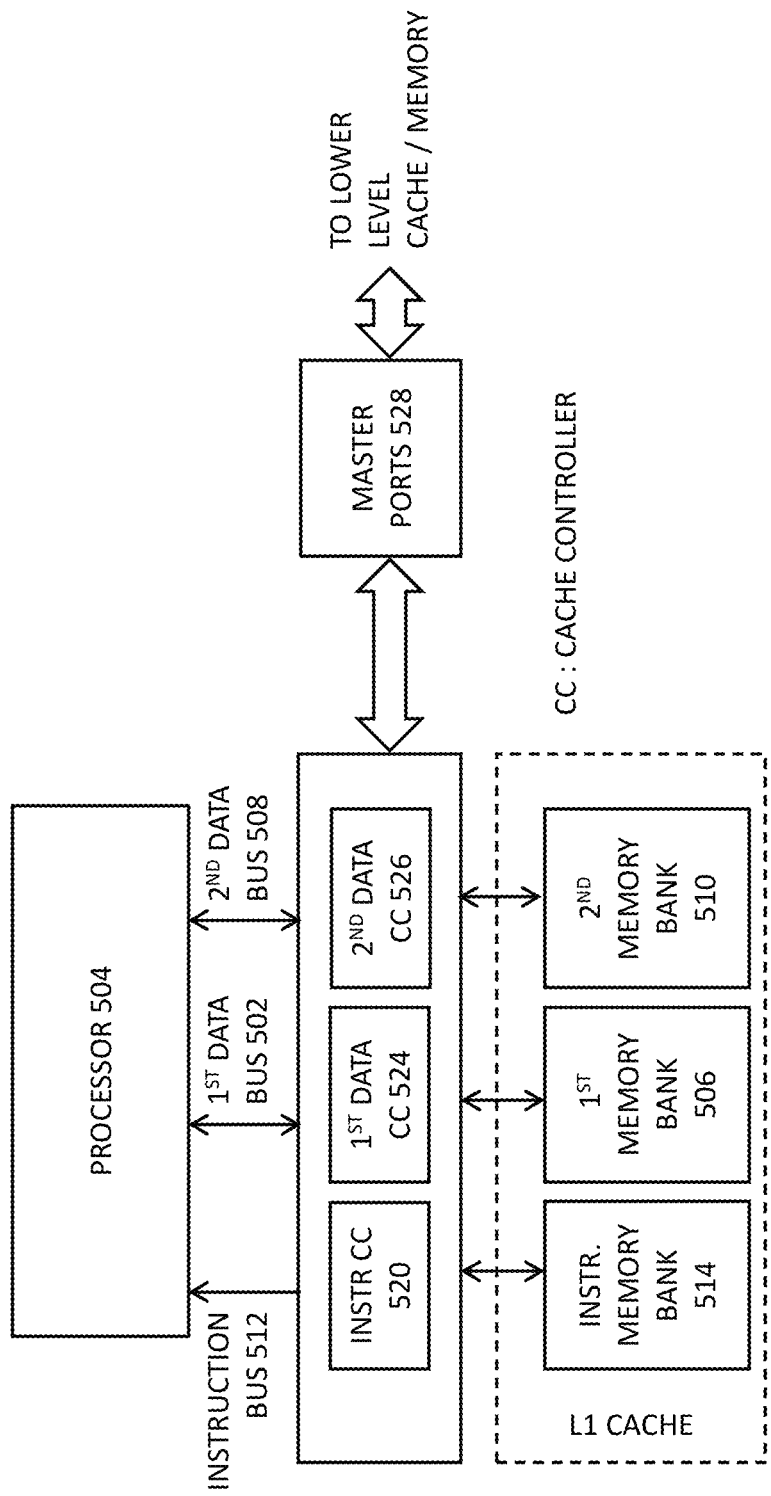
FIG. 5 show a detailed view of a bus-based data cache system for a processor, according to some embodiments of the disclosure.

FIG. 5 show a detailed view of a bus-based data cache system for a processor, according to some embodiments of the disclosure. In the example shown, the bus-based cache memory system for dual-data cache access includes a first data bus 502 for receiving data memory accesses from a processor 504, a first data memory bank 506 for caching data accessed by the processor 504, a second data bus 508 for receiving data memory accesses from the processor 504, a second data memory bank 510 for caching data accessed by the processor 504. The first data memory bank 506 is a first default memory bank for data memory accesses received over the first data bus 502 and the second data memory bank 510 is a second default memory bank for data memory accesses received over the second data bus. For fetching instructions, the bus-based data cache system further includes an instruction bus 512 for receiving instruction memory accesses from the processor; and an instruction memory bank 514 for caching instructions. Generally speaking, the instruction bus 512 supports fetching (reading) instructions over instruction bus 512 for the processor. The first data bus 502 and the second data bus 508 can each support fetching (reading) and writing data over the first data bus 502 and the second data bus 508 respectively. In the example shown, the instruction memory bank 514, first data memory bank 506, and the second data memory bank 510 are provided as part of the L1 cache (i.e., memory element closest to processor 504). In some embodiments, the L1 cache can include other memory banks for storing directly addressed L1 data.

Note that any data brought in to the cache from lower level memory or cache as a result of a data access over the first data bus 502 is stored in first data memory bank 506 and any data brought in to the cache from lower level cache or memory as a result of a data access over the second data bus 508 is stored in second data memory bank 510. This cache organization scheme is provided irrespective of the address of the data involved.

The bus-based cache memory system can include cache controllers (abbreviated as "CC" in the FIGURE). Cache controllers can be provided as part of the memory system to manage accesses to the memory system, e.g., serving replies to the processor from the appropriate level of memory in response to memory accesses. The bus-based cache memory system can include instruction cache controller 520 for managing instruction accesses (e.g., such as checking the instruction memory bank 514, a first data cache controller 524 for managing data accesses received over the first data bus 502, and a second data cache controller 526 for managing data accesses received over the second data bus 508.

Generally speaking, a data cache controller can provide various functions. For instance, the data cache controllers can check in a tag memory (maintained within the cache controller) to evaluate whether a corresponding memory bank has data corresponding to the cache line associated with the data access (i.e., determine whether the data is stored in the memory bank or check whether the memory bank has the data corresponding to the access request). This step is sometimes referred to as "evaluating a hit for a memory bank". For instance, the data cache controller can check the tag memory to determine whether data for a particular memory address is stored in the memory bank (where the tag memory would typically maintain information indicating which memory addresses are cached in the memory bank). If the data for the particular memory address is in the memory bank, the tag memory can output a "hit". If the data for the particular memory address is not in the memory bank, the tag memory can output a "miss". If the data is in the memory bank (referred herein as a "hit"), the data cache controller can provide the data stored in the memory bank back to the processor (as a reply in response to the memory access). If the data is not in the memory bank (referred herein as a "miss"), the data cache controller processes the miss and determines the next steps for fetching the data requested by the data memory access (e.g., passes on the data memory request over master ports 528 to fetch the data in lower level cache/memory). A data cache controller can also update the cached data when the processor 504 writes to a memory address.

It is noted that one person skilled in the art would appreciate that the memory system can provide even more data buses with respective default memory banks and cache controllers if more data access bandwidth is needed.

In one view of the bus-based data cache system, the first data cache controller 524 and the first data memory bank 506 make up a first data cache serving the first data bus 502, and the second data cache controller 526 and the second data memory bank 510 make up a second data cache serving the second data bus 508. In this view, the bus-based cache memory system has two data caches each having a respective memory bank, where each one of the two data caches serves as a default cache for the respective data bus. In another (equivalent) view of the bus-based data cache system, the first data cache controller 524, the first data memory bank 506, the second data cache controller 526, and the second data memory bank 510 make up a unified data cache serving the first data bus 502 and the second data bus 508. In this view, the bus-based cache memory system has a unified data cache having two underlying memory banks, where each one of the underlying memory banks serves as a default memory bank for the respective data bus.

Separating Buffers Over the Buses Avoids Memory Bank Conflicts

When compared to conventional cache architectures, the bus-based cache memory system can be more efficient and poses less constraints on the programmer when trying to avoid memory bank conflicts. To better understand how a bus-based cache memory system would operate, the following passages describes the nature of the data accesses by programs running on the processor, and how it is possible to practically eliminate memory bank conflicts by separating buffers over the buses connected to respective single-ported (default) memory banks.

DSP algorithms performed by the processor often deal with two independent streams of data values as source. Furthermore, the data sets accessed by two buses usually do not overlap, i.e., the two memory accesses for an instruction typically access two different data buffers from two different data sets. A typical example is the FIR operation, computation of one tap per cycle requires two data accesses from two different data buffers. If the processor is fetching data from the two data sets for the instruction, and the processor can do so over the two buses (one bus for one data set, and the other bus being used for the other data set) it is practically possible to eliminate any memory bank conflicts because the bus-based bank organization of caches as described herein can make sure that the two data accesses will not map to the same memory bank.

Figure 6:
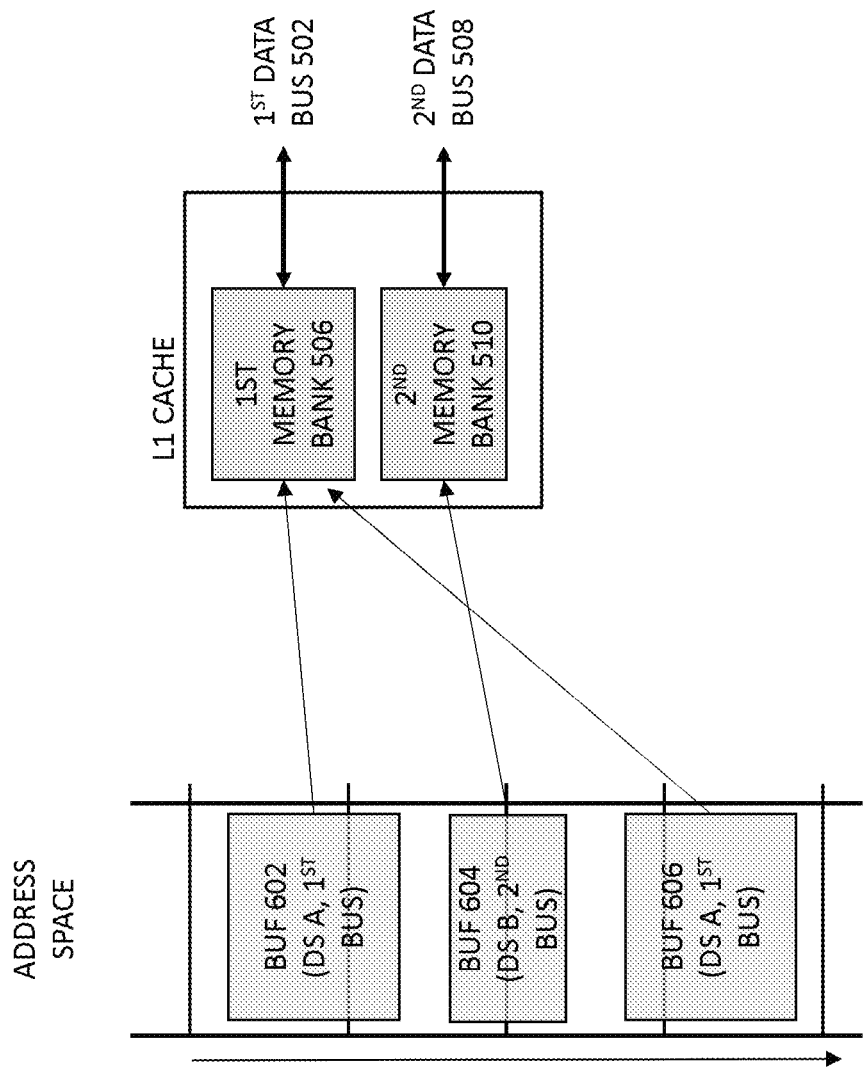
FIG. 6 illustrates allocation of buffers to buses for reducing conflicts, according to some embodiments of the disclosure.

FIG. 6 illustrates allocation of buffers to buses for reducing conflicts, according to some embodiments of the disclosure. In the address space (e.g., L3, or main memory address space), the drawing shows there are three data buffers: buffer 602 and buffer 606 belonging to belonging to data set (DS) A, and buffer 604 belonging to data set (DS) B. Data set A and data set B can thus be separated over the buses (first data bus 502 and second data bus 508) of a dual-ported cache implemented using single-ported default memory banks (first memory bank 508 and second data memory bank 510). When the processor accesses data in buffer 602, the processor should use the first data bus 502, and the data from buffer 602 can be cached in the first data memory bank 506. Likewise, when the processor accesses data in buffer 606, the processor should use the first data bus 502 and the data from buffer 606 should be cached in the first data memory bank 506. When the processor access data in buffer 604, the processor should use the second data bus 508 and the data from buffer 604 can be cached in the second data memory bank 510.

If the processor accesses data from buffer 602 and buffer 604 to perform an instruction, data memory accesses are received over the first data bus 502 and the second data bus 508 respectively. The data for buffer 602 and the data for buffer 604 can be cached in the first data memory bank 506 and the second data memory bank 510 respectively. The data memory accesses can be served using the dual-ported L1 cache having single-ported memory banks, and there would be no memory bank conflicts as long as data memory accesses for data set A and data set B are separated over the first data bus 608 and the second data bus 612.

If the program accesses a first set of data buffers via a first memory bus and a second set of data buffers via a second memory bus, the bus-based cache system can provide the instruction and two data values (if cached, in one cycle) for instructions that operate on one data value from the first set of data buffers and another data value from the second set of data buffers. This is not an impossible constraint due to the observation that most dual-data accesses are accessing data from different data sets anyway. Thus, data bandwidth from memory is achieved without some of the issues of conventional truly multi-ported caches and conventional banked caches.

It is noted that data buffers in this improved bus-based data cache system (i.e., utilizing the improved bus-based bank organization) are no longer required to be aligned to page/sections boundaries in the address space to avoid memory bank conflicts. In conventional caches, data buffers must be carefully allocated to appropriate memory addresses to eliminate conflicts. As previously described in relation to FIG. 3B, conventional data caches requires programmers to align buffers to boundaries of sections in the address space allocated to respective memory banks to avoid memory bank conflicts. When the buffers are not aligned to the boundaries of sections in the address space, as described in relation to FIG. 3C, conflicts can occur and such conflicts can increase latency. In contrast to conventional data caches, the improved bus-based data cache system does not have such a requirement to avoid conflicts. Furthermore, depending on the access patterns to data set A and data set B, it is possible for the memory banks of the improved bus-based data cache system to be sized differently in the bus-based cache system (making it possible to optimize the area needed for the individual memory banks for the same performance).

Using the bus-based cache memory system (utilizing the bus-based bank organization), one data memory access to the first set of data buffers and another data memory access to the second set of data buffers would not result in a memory bank conflict. The bus-based cache memory system can support dual-data cache access using single-ported memory banks, where the single-ported memory banks can concurrently serve memory accesses to the processor. Accordingly, the bus-based data cache architecture described herein can provide requisite data access bandwidth of truly multi-ported caches with the efficiency and simplicity of single-ported caches.

Advantages of a Bus-Based Cache System

Compared to caches having multiple banks assigned to respective pages of the memory space, or truly multi-ported caches, the bus-based cache can have one or more of the following advantages.

First, a bus-based cache is more area- and power-efficient compared to a truly dual ported cache (using dual ported memory). This is because dual-ported memory cells are larger and consumes more static as well as dynamic power. The bus-based cache uses two instances of caches to provide double the bandwidth where the caches incorporate just single-ported memory banks.

Second, bus-based cache delivers higher data access throughput than a cache having multiple banks allocated to pages in the memory space ("a conventional multi-banked cache"). A conventional multi-banked cache seeks to provide two bus bandwidth by minimizing access conflict at the bank level. However, since it is difficult to make sure the data accesses over two buses are always to different banks (programming according to such a constraint can be unnatural and cumbersome to avoid), conflicts are inevitable, leading to reduction of data bandwidth from ideal two-bus bandwidth. There is an inverse relationship between the frequency of conflict to number of banks and therefore total size of the cache. Bus-based cache does not suffer from such conflicts.

Third, while certain DSP kernels need to access data from two buffers over two buses, processing outside of the these kernels typically requires access to one data buffer over one bus. Benchmarking shows that the two data caches (i.e., the memory banks therein), which are tied to data sets instead of pages of the memory space, can be of different sizes while maintaining the same performance. Conventional multi-banked caches (blindly) allocate the single-ported memory banks of the same size to different pages of the memory space. Bus-based cache allows asymmetrical sizing of single-port caches without loss of performance, which in turns provides the possibility of being able to optimize the size of the memory banks.

Coherence

Two data caches (each having a respective memory bank) caching copies of data from a shared memory resource is prone to having data coherence issues—problems arising from inconsistent data across the two data caches. Thus, a data coherence mechanism may be needed to guarantee that there is a single copy of a particular datum in two caches. If there are multiple copies of a particular datum, a stale/inconsistent copy can be incorrectly returned to the processor and cause the instruction to operate on bad data. Furthermore, if multiple copies of a particular datum is allowed to be stored in the two memory banks (in some caches copies are duplicated, usage efficiency of the memory banks is affected because one of the memory bank is maintaining a stale/useless copy of the particular datum without serving any beneficial purpose while using up expensive cache resources.

Since all the accesses over one bus is served by one default data cache, and access over the other bus is served by the other default data cache, irrespective of their addresses, there is a possibility of a particular datum having a copy in both caches in absence of any hardware coherence mechanism. Specifically, this can occur if the program accesses the particular datum over one bus, and subsequently accesses the particular datum again over the other bus. Ideally, if it could be guaranteed by programmer that a particular datum is always accessed over a specific bus, a coherence mechanism is not needed. Since this programming requirement may be difficult to meet under all circumstances, a data coherence mechanism in hardware can be provided for functional correctness of program execution.

Cross Check for Data Coherence

A light duty data coherence mechanism, referred herein as "cross check", can be provided to deal with the case where a datum was first accessed over the first data bus, thereby getting allocated in first memory bank of the first cache and then being accessed by the second data bus (and vice versa). The data coherence mechanism aims to alleviate the issue of cross-referencing of same data buffer resulting in a miss in the default memory bank, if cross-referencing of the same data buffer over two buses is not frequent or at least the choice of a particular bus to access a datum can be reasonably restricted to conform to this requirement.

Figure 7:
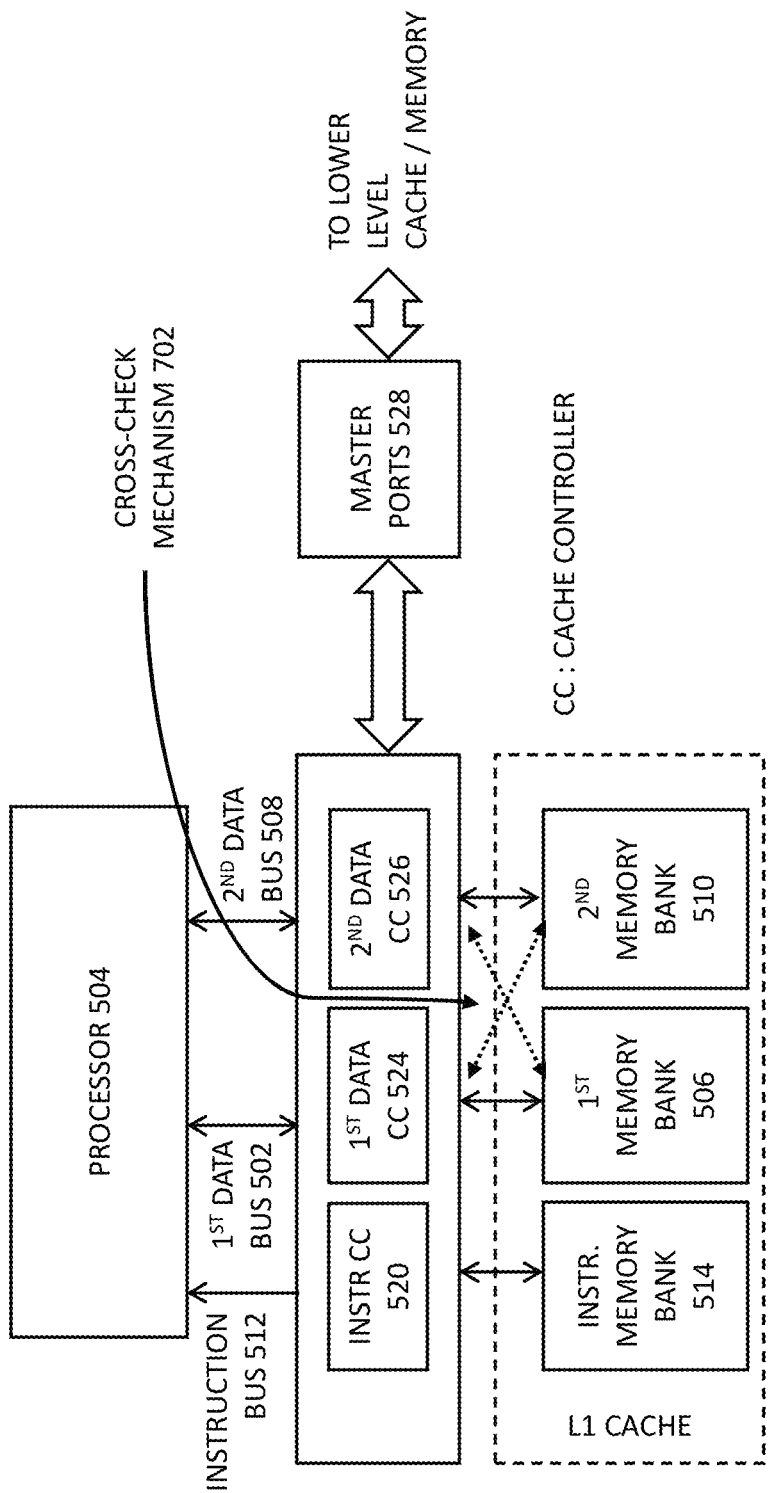
FIG. 7 show an exemplary bus-based data cache system for a processor having cross check paths, according to some embodiments of the disclosure.

FIG. 7 show an exemplary bus-based data cache system for a processor having cross check paths, according to some embodiments of the disclosure. The drawing shows the bus-based data cache system having a cross check mechanism 702 for checking whether a "remote" memory bank has the requested data if the checking whether the default memory bank has the requested data results in a miss.

In this example, the first data cache having first cache controller 524 and the first data memory bank 506 serves as the default cache for the first data bus 502 (the first memory bank therein is assigned as the default memory bank for the first data bus 502). The second data cache having the second cache controller 526 and the second data memory bank 510 is the "remote" cache for the first data bus 508 (the second data memory bank 510 therein is assigned as the remote memory bank for the first data bus 502).

The second data cache having the second cache controller 526 and the second data memory bank 510 is the default cache for the second data bus 508 (the second data memory bank 510 therein is assigned as the default memory bank for the second data bus 508), and the first data cache is the "remote" cache (the first data memory bank 506 is the assigned as the remote memory bank for the second data bus 508).

If checking whether the first memory bank 508 has the requested data in response to receiving a memory access over the first data bus 502 results in a miss, then a cross-check mechanism 702 checks whether the second data memory bank 510 has the requested data. If the second data memory bank 510 has the requested data, the second data memory bank 510 can serve the data. Likewise, if checking whether the second data memory bank 510 has the requested data in response to receiving a memory access over the second data bus 508 results in a miss, then the cross-check mechanism 702 checks whether the first data memory bank 506 has the requested data. If the first data memory bank 506 has the requested data, the first data memory bank 506 can serve the data.

In some embodiments, cross check paths (not shown in this FIGURE) can be provided to allow a first cache controller 524 (serving the first data bus 502) to access/retrieve data from the second data memory bank 510, and to allow a second cache controller 526 (serving the second data bus 508) to access/retrieve data from the first data memory bank 506. For instance, a cross-check path for an access request received over the first data bus 502 can traverse these elements in the following order: the first cache controller 524 (miss), the second cache controller 526 (*hit*), and second data memory bank 510 (serves the data). In another instance, a cross-check path for an access request received of the second data bus 508 can traverse these elements in the following order: the second cache controller 526 (miss), the first cache controller 524 (*hit*), and the first data memory bank 506 (serves the data).

Broadly speaking, in case of a miss in either of the data memory banks, one additional cycle is taken to look for it in the other memory bank. If that cross check results in a hit then the data is accessed from that cache. In case of a miss in cross check, normal miss processing takes place (where the data access is forwarded to lower level memory and/or main memory).

The qualifier "default" as used in this patent application applies to the manner of how a cache controller evaluates a hit. Specifically, the qualifier "default" applies to which data memory bank the cache controller should try to evaluate a hit first. Note that the first data memory bank 506 is the "default" location for checking for a hit for an access received over the first data bus 502 but the first data memory bank 506 is the only bank where the data resulting out of miss of an access on the first data bus 502 resides (the second data memory bank 510 does not store data resulting out of a miss of an access on the first data bus 502). The same can be said about the second memory bank 510, where the second data memory bank 510 is the "default" location for checking for a hit for an access received over the second data bus 508 but the second data memory bank 510 is the only bank where the data resulting out of miss of an access on the second data bus 508 resides (the first data memory bank 506 does not store data resulting out of a miss of an access on the second data bus 508).

Figure 8:
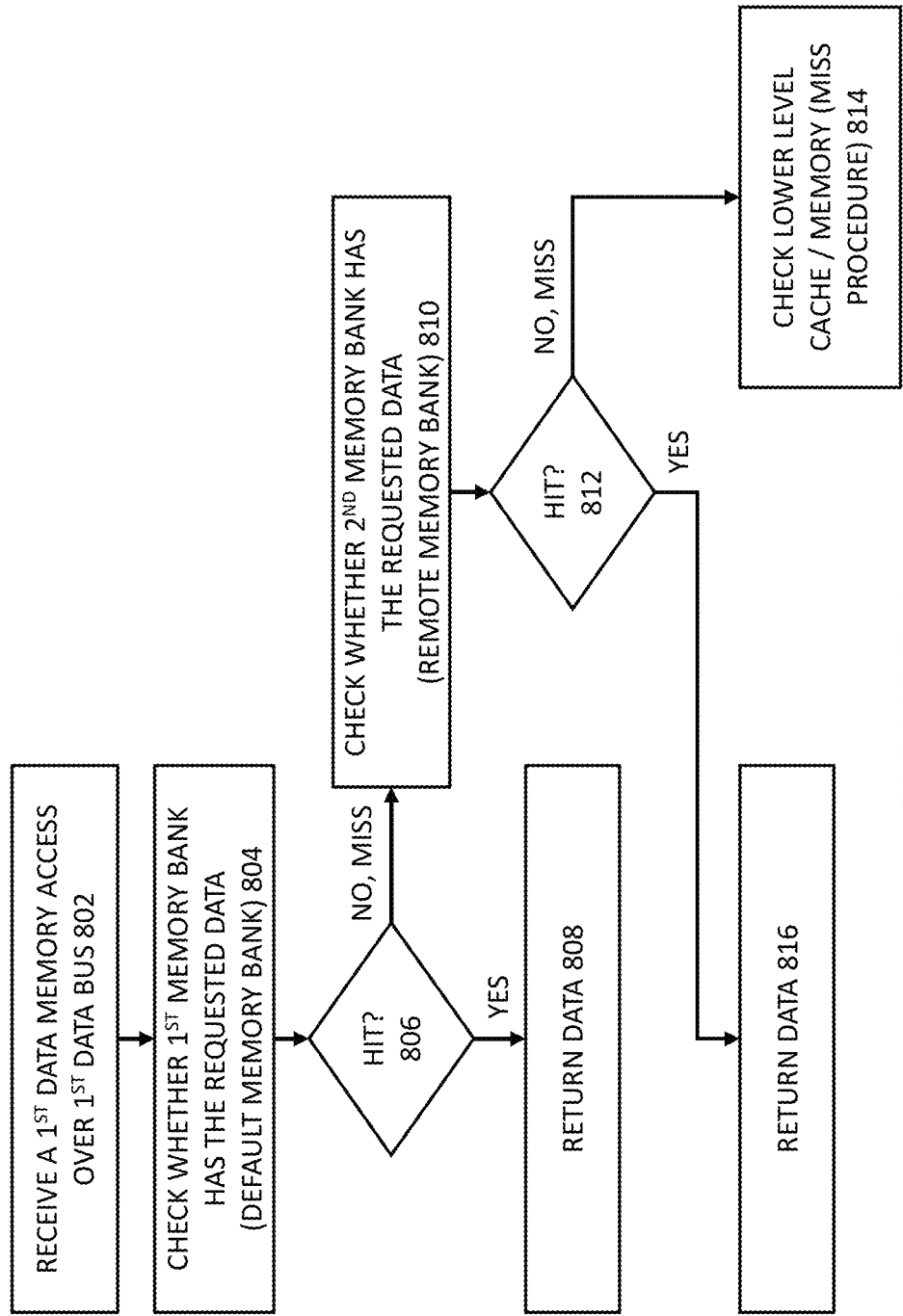
FIG. 8 illustrates a method for providing dual-data cache access using a bus-based data cache system having cross check paths, according to some embodiments of the disclosure.

FIG. 8 illustrates a method for providing dual-data cache access using a bus-based data cache system having cross check paths, according to some embodiments of the disclosure. The illustration shows an example process performed by a bus-based data cache system having the cross check mechanism in response to a first data memory access received over a first data bus. The same principle of the cross check mechanism applies when it is a data memory access received over the second data bus.

In box 802, first data cache controller receives a first data memory access over a first data bus. The bus-based data cache system evaluates whether the default cache would result in a hit. Thus in box 804, the first data cache controller checks whether the first memory bank (the default memory bank) has data corresponding to the first data memory access because the first memory bank is the default cache for data memory accesses received over the first data bus.

In diamond 806, the process branches (i.e., "no, resulted in a miss" versus "yes, resulted in a hit") depending on the result from checking whether the first memory bank has data corresponding to the first data memory access, i.e., a hit or a miss.

If checking whether the first memory bank has data corresponding to the first data memory access results in a hit, normal procedure continues and the data is returned to the processor. Specifically, if checking whether the first memory bank has data corresponding to the first data memory access resulted in a hit (the data is found/cached in the first memory bank), in box 808, the first cache controller returns the data corresponding to the first data memory access from the first memory bank to the processor.

If checking whether the first memory bank has data corresponding the first data memory access results in a miss, the process proceeds to implement the cross check mechanism. Specifically, if checking whether the first memory bank has data corresponding to the first data memory access resulted in a miss, in box 810, the first cache controller checks the second memory bank (the remote memory bank) for the data corresponding to the first data memory access.

In diamond 810, the process branches (i.e., "no, resulted in a miss" versus "yes, resulted in a hit") depending on the result from checking whether the second memory bank has data corresponding to the first data memory access, i.e., a hit or a miss.

If checking whether the second memory bank has the data corresponding to the first data memory access resulted in a miss, in box 814, the first cache controller proceeds to check whether a memory having longer access time than the first and second memory banks (e.g., lower level cache and/or main memory) has data corresponding to the first data memory access. This step corresponds to a normal miss procedure, e.g., when checking an L1 cache results in a miss. It is noted that the data ("cache line") fetched from lower level in the memory system in servicing the miss is subsequently stored in the first cache (i.e., the first memory bank).

If checking whether the second memory bank has the data corresponding to the first data memory access result in a hit, in box 816, the data corresponding to the first data memory access is returned from the second memory bank to the processor. It is noted that the data corresponding to the first data memory access is not moved or duplicated or written to the first memory bank if checking the second memory bank for the data corresponding to the first data memory access resulted in a hit. In other words, the data corresponding to the first data memory access remains in the second memory bank.

The cross check hardware coherence mechanism does not impact performance in a significant way if the same data is accessed over both the first data bus and the second data bus infrequently. The additional cycle required to perform cross check is a small fraction of cycles taken to service a (complete) miss, i.e., serving the data from the lower level memory or main memory.

Sticky-Cross Check for Optimizing Average Latency

The cross check hardware coherence may have significant impact on performance when cross check frequently results in a hit (referred herein as "cross check hits"). This implies that the data requested over one bus (e.g., the first data bus) is not found in the respective default cache but is found/cached in the remote cache (e.g., the second memory bank). As a result, the data access takes more than a cycle (due to the cross check mechanism), when it should have been ideally been zero-latency access.

In some cases, when an entire data buffer was first accessed over a first data bus and then over a second data bus or vice versa, the second set of accesses over the second data bus may result in frequent cross check hits. To mitigate the overhead due to the cross check mechanism, the bus-based data cache system can include an optimization feature called "sticky cross check". Sticky cross check is provided based on the assumption that the occurrence of a cross check hit for an access to data from a particular buffer indicates that the data for the particular buffer is cached in the remote cache (i.e., stored in the "remote memory bank"). Accordingly, the average latency can be improved if future accesses to the same particular buffer causes the cache controller to check the remote cache first (i.e., check whether the "remote memory bank" has the requested data first). If the data for the particular buffer is indeed cached in the remote cache, the normal zero-latency access is achieved without suffering from the extra cycle incurred from the cross check mechanism.

To provide "sticky cross check", information regarding whether there was a cross check hit for the last access to a particular data buffer can be maintained for different data buffers. The information can be set based on the last access to the particular data buffer, or a pattern of past accesses to the particular data buffer. For instance, the information can be maintained in a sticky bit (one for each of the different data buffers), such that when a data access is received for a particular data buffer, the sticky bit can influence which memory bank should be checked first.

Note that the "sticky cross check" mechanism and the use of a "sticky bit" set an exception to the cache controller checking for data in the "default" cache first. When the sticky bit is set in response to a cross check hit, the cache controller checks for data in the "remote" cache first, and not in the "default" cache first.

Figure 9:
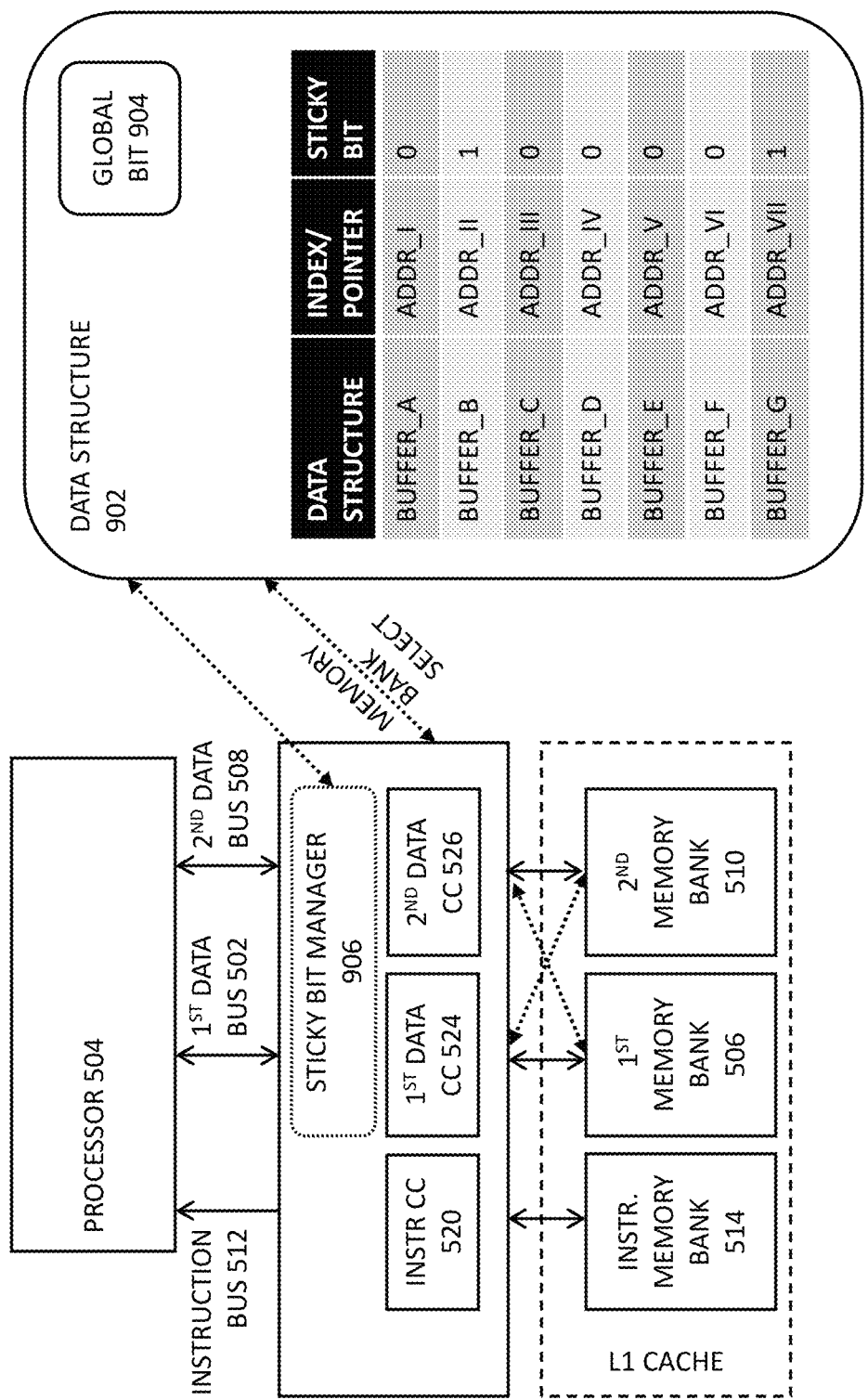
FIG. 9 show an exemplary bus-based data cache system for a processor having sticky cross check, according to some embodiments of the disclosure.

FIG. 9 show an exemplary bus-based data cache system for a processor having sticky cross check, according to some embodiments of the disclosure. Broadly speaking, processors can include a data structure (maintained by software and/or hardware) 902 which maintains index/pointer memory addresses usable for accessing corresponding data buffers in memory. To provide the sticky cross check feature, the bus-based data cache system can include a sticky bit having a first state and a second state, wherein a sticky bit is provided for each data buffers (if desired).

For instance, a single bit having states "0" and "1" can be used to implement the sticky bit. The first state indicates that a recent memory access for the data buffer did not result in a cross check hit, or indicates to the cache controller that the cache controller should check the default cache first (i.e., check whether the "default memory bank" has the requested data first). The second state indicates that a recent memory access for the data buffer resulted in a cross check hit, or indicates to the cache controller that the cache controller should check the remote cache first (i.e., check whether the "remote memory bank" has the requested data first before checking the default cache). During operation, a first data cache controller can be configured to, in response to a second memory access associated with the memory address pointer received over the first data bus, select the first memory bank as the first default memory bank or the second memory bank as the first default memory bank for the second memory access based on the state of the sticky bit.

The data structure 902 can be implemented in different manners depending on the computer architecture. Broadly speaking, the sticky bit can correspond to a memory address pointer usable for accessing a data buffer. The memory address pointer can be stored in a pointer register or some other memory element of the computer system. When an access results in a cross check hit, the sticky bit corresponding to associated memory address pointer (i.e., the data buffer) is set, e.g., to indicate to the cache controller that the next memory access for the data buffer should check the remote cache first. Accesses over any bus is sent to the remote cache first if the sticky bit corresponding to the associated memory address pointer is set to indicate as such. A hit keeps the sticky bit set, but a miss can reset it.

For instance, a typical DSP may have a set of pointer registers, which can be used to hold base address or current address within a data buffer, from which memory accesses can be generated. Multiple pointer registers help increase performance by reducing the need for loading and storing pointer values from/to memory frequently. For instance, some DSPs can include a set of pointer registers; some of them are dedicated to generate addresses for accesses to a first set of data buffers and some of them are dedicated to generate addresses for access to a second set of data buffers. Each of these pointer registers is provided with a corresponding dedicated sticky-cross check hardware bit. When the memory address pointer is stored in a pointer register, the sticky bit can correspond to the pointer register (e.g., providing an extra bit with the pointer register for storing the sticky bit).

A hardware mechanism, i.e., a sticky bit manager 906, can be implemented with the cache controllers for setting the sticky bits corresponding to different data buffers. Such a hardware mechanism can be transparent to the software running on the processor. In some cases, a software mechanism (e.g., similar to the hardware sticky bit manager 906, but instead a software mechanism comprising instructions for providing the sticky bit manager and said instructions executable by processor 504) can be provided to set the sticky bits. Such a mechanism can be beneficial if the program fetching data is aware the previous access(es) to the same data buffer were made using a different data bus than the data bus the program is seeking to use. The program fetching the data can cause the sticky bit manager 906 to set the sticky bit to avoid the extra latency caused by a cross check hit. In some cases, a global enable bit 904 can be set or reset by software (e.g., sticky bit manager 906) to optionally enable or disable the sticky cross check feature.

Figure 10A:
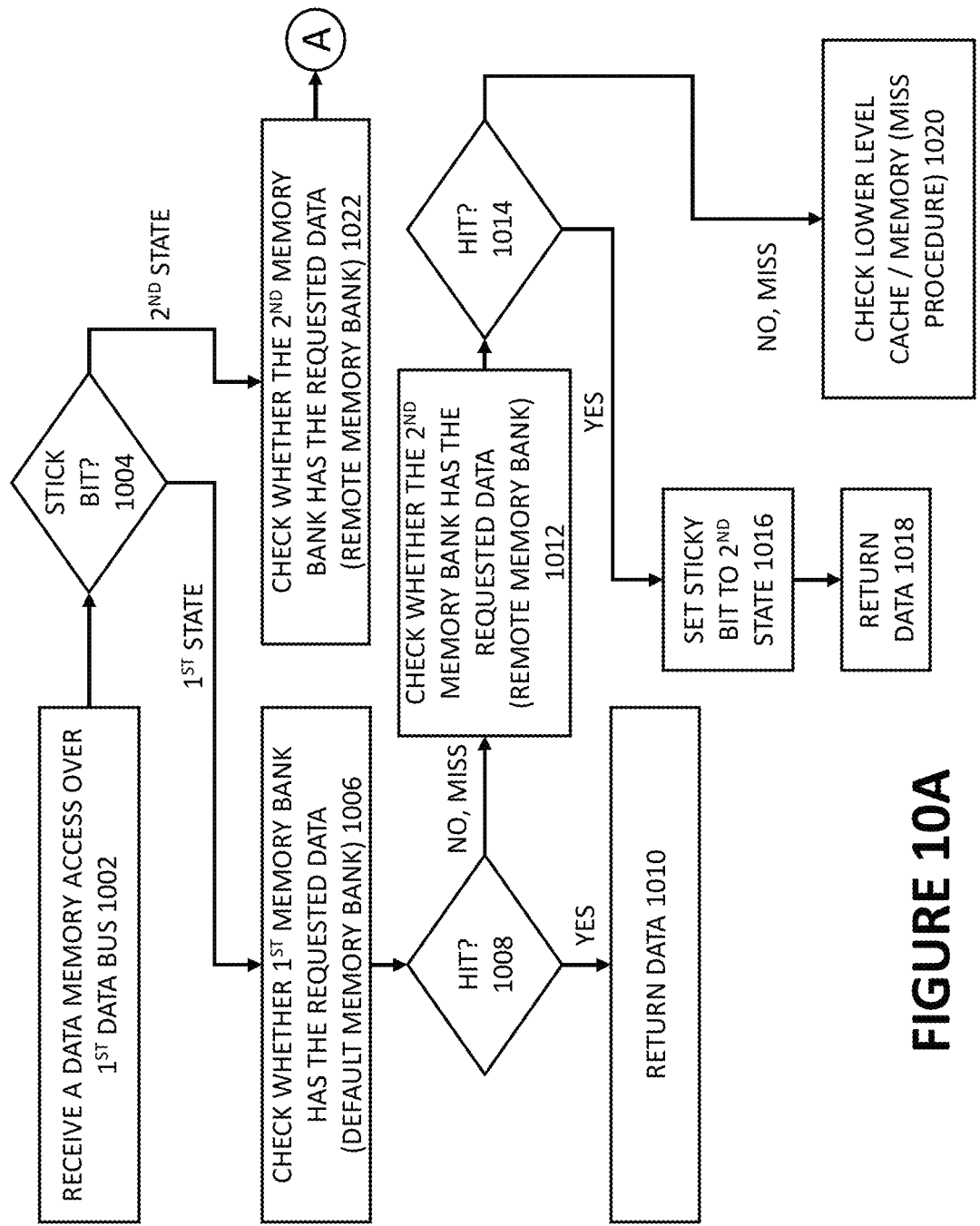
FIGS. 10A-B illustrates a method for providing dual-data cache access using a bus-based data cache system having sticky cross check, according to some embodiments of the disclosure.
Figure 10B:
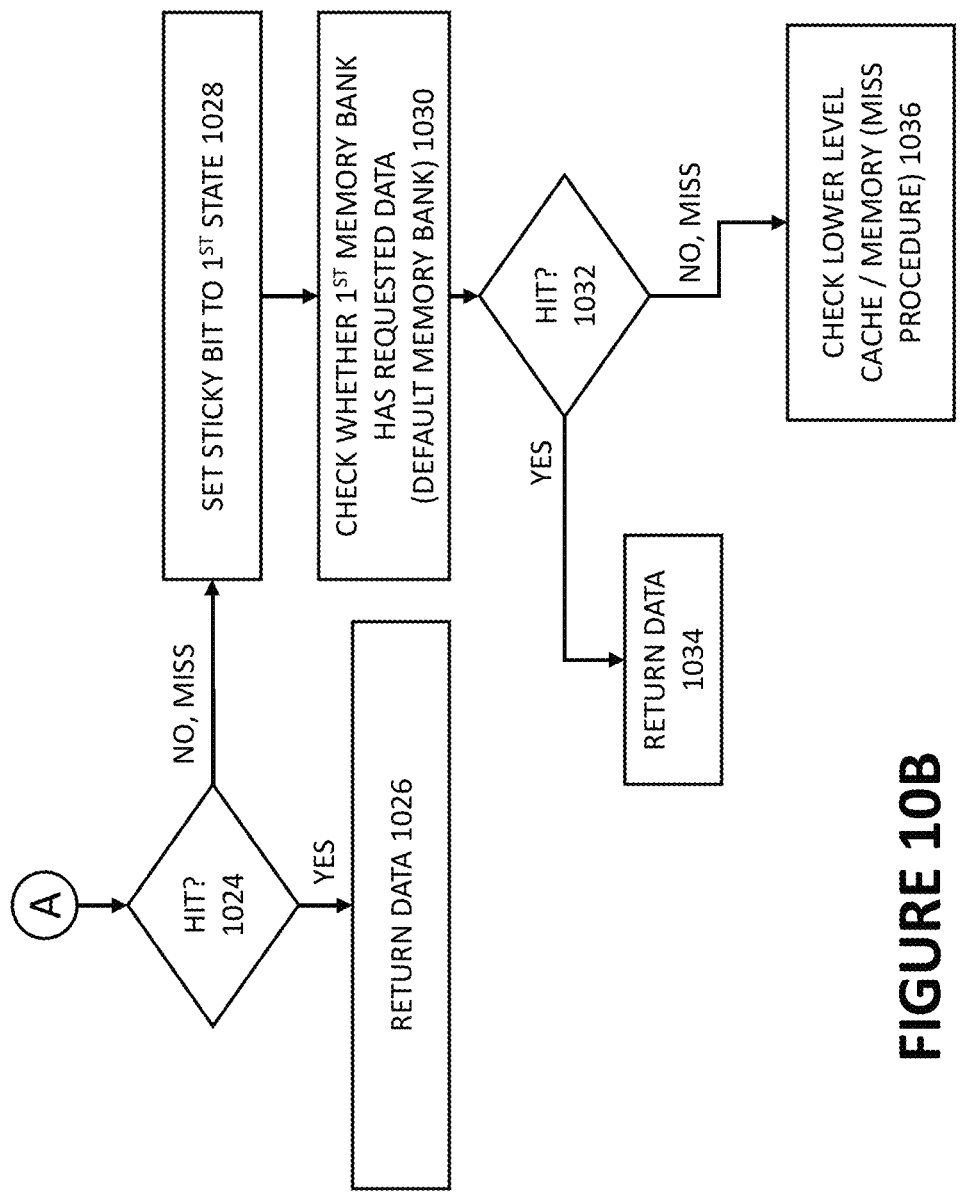

FIGS. 10A-B illustrates a method for providing dual-data cache access using a bus-based data cache system having sticky cross check, according to some embodiments of the disclosure. A sticky bit having a first state (indicating normal cross check) and a second state (indicating sticky cross check) is provided and the sticky bit corresponds to a memory address pointer usable for access a data buffer. In box 1002, a first data cache controller receives a second memory access generated using the memory address pointer over the first data bus. The sticky bit corresponding to the memory address pointer is checked in diamond 1004.

If the sticky bit is in the first state, in box 1006, the first cache controller checks the first memory bank for data corresponding to the second memory access (note the first memory bank is the "default memory bank" for accesses received over the first data bus). In diamond 1008, the process branches (i.e., "no, resulted in a miss" versus "yes, resulted in a hit") depending on the result from checking whether the first memory bank for data corresponding to the second data memory access, i.e., a hit or a miss.

If checking whether the first memory bank has the data corresponding to the second memory access results in a hit, in box 1010, the data corresponding to the second memory access is returned from the first memory bank to the processor. If checking whether the first memory bank has the data corresponding to the second memory access results in a miss, in box 1012, the first cache controller checks whether the second memory bank has data corresponding to the second memory access (the second memory bank being the remote memory bank for the first data bus).

In diamond 1014, the process branches (i.e., "no, resulted in a miss" versus "yes, resulted in a hit") depending on the result from checking whether the second memory bank has data corresponding to the second data memory access, i.e., a hit or a miss.

If checking whether the second memory bank has data corresponding to the second memory access results in a hit, in box 1016, the first data cache controller can set the sticky bit to the second state (to indicate that there was a cross-check hit). The sticky bit being set to the second state can affect a further (subsequent) data access to the same data buffer (the process is described below in relation to a third memory access received over the first data bus for the same data buffer). In box 1018, the first cache controller returns data corresponding to the second data memory access from the second memory bank to the processor. (Steps in box 1016 and 1018 do not have to follow the order as shown, i.e., step in box 1018 can be performed before step in box 1016, or the steps can be performed in parallel.)

If checking whether the second memory bank has data corresponding to the second memory access results in a miss, in box 1020, the first cache controller proceeds to check whether a memory having longer access time than the first and second memory banks (e.g., lower level cache and/or main memory) has data corresponding to second first data memory access. This step corresponds to a normal miss procedure when L1 cache results in a miss.

Consider a further example, where the first cache controller subsequently receives a third memory access generated using the memory address pointer over the first data bus (corresponding to box 1002) when the sticky bit corresponding to the memory address pointer is now in the second state. The first cache controller checks if the sticky bit is in the first state or the second state (check performed in diamond 1004). If the sticky bit is in the second state, in box 1022, the cache controller checks whether the second memory bank (in this case the "remote memory bank" for the first data bus) has data corresponding to the second memory access first.

In diamond 1024, the process branches (i.e., "no, resulted in a miss" versus "yes, resulted in a hit") depending on the result from checking whether the second memory bank for data corresponding to the third data memory access, i.e., a hit or a miss.

If checking whether the second memory bank has data corresponding to the third memory address resulted in a hit, in box 1026, the first cache controller returns data corresponding to the third memory access to the processor.

If checking whether the second memory bank has data corresponding to the third memory address resulted in a miss, in box 1028, the first cache controller can set the sticky bit to the first state. This is because it is unlikely that sticky cross check is needed for the next memory access to the same buffer when the data corresponding to the third memory access cannot be found in the second memory bank (the remote memory bank). Accordingly, the next memory access can use the normal procedure of checking whether the first memory bank has the data corresponding to the third memory access first (checking the "default memory bank" first). In box 1030, the first cache controller checks whether the first memory bank (the "default memory bank" for the first data bus) has the data corresponding to the third memory access. This is similar to the normal cross check procedure, except this cross-check begins with checking the remote cache first. (Steps in box 1028 and 1030 does not have to follow the order as shown, i.e., step in box 1030 can be performed before step in box 1028, or the steps can be performed in parallel.)

In diamond 1032, the process branches (i.e., "no, resulted in a miss" versus "yes, resulted in a hit") depending on the result from checking whether the first memory bank for data corresponding to the third data memory access, i.e., in a hit or a miss.

If checking whether the first memory bank has the data corresponding to the third memory access results in a hit, in box 1034, the data corresponding to the third memory access is returned from the first memory bank to the processor. If checking whether the first memory bank has the data corresponding to the third memory access results in a miss, in box 1036, the first cache controller proceeds to check whether a memory having longer access time than the first and second memory banks (e.g., lower level cache and/or main memory) has data corresponding to the third data memory access. This step corresponds to a normal miss procedure when L1 cache results in a miss.

In some cases, the first data cache controller is further configured to set the sticky bit to the first state (resets the sticky bit so that the cache controller checks the default memory bank first) if the pointer register or memory element for storing the memory address pointer is written to, as it is an indication that the data buffer to which the pointer register is associated has changed. For DSPs or processors which utilizes index registers (in hardware), the method illustrated in FIG. 10A-B can further include setting the sticky bit to the first state when the index register is written to or updated. This is because when the index register is written to or updated, the index register is likely to be pointing to a new data buffer and the sticky bit information is likely to no longer apply.

Variations and Implementations

In the discussions of the embodiments above, other components of the FIGURES can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits for providing the systems shown in the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the systems of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that can leverage high data bandwidth from the cache. Some of these systems can execute specialized software programs, or algorithms, some of which may be associated with processing digitized real-time data. Certain embodiments can relate to multi-DSP signal processing, floating point processing, signal/control processing, fixed-function processing, microcontroller applications, etc. Broadly, the activities discussed above with reference to the FIGURES are applicable to computer systems where high data bandwidth access to memory is desired for optimal performance.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc. In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the systems of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to bus-based cache memory systems, illustrate only some of the possible bus-based data cache system functions that may be executed by, or within, systems illustrated in the FIGS. 8 and 10A-B. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for"

or "step for" are specifically used in the particular claims; and (b) does not intend, by any statement in the specification, to limit this disclosure in any way that is not otherwise reflected in the appended claims.

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for clocking data from the digital core onto a first data output of a macro using a first clock, the first clock being a macro clock; means for clocking the data from the first data output of the macro into the physical interface using a second clock, the second clock being a physical interface clock; means for clocking a first reset signal from the digital core onto a reset output of the macro using the macro clock, the first reset signal output used as a second reset signal; means for sampling the second reset signal using a third clock, which provides a clock rate greater than the rate of the second clock, to generate a sampled reset signal; and means for resetting the second clock to a predetermined state in the physical interface in response to a transition of the sampled reset signal.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A bus-based cache memory system for dual-data cache access in reading data, the bus-based data cache system comprising:
   one or more cache controllers configured to:
   receive read requests from a processor over a first data bus,
   receive read requests from the processor over a second data bus;
      a first memory bank configured to be a default memory bank for storing data requested by one or more of the read requests received by the one or more cache controllers over a first one of the first data bus and the second data bus; and
      a second memory bank configured to be a default memory bank for storing data requested by one or more of the read requests received by the one or more cache controllers over a second one of the first data bus and the second data bus,
   wherein the one or more cache controllers are further configured to:
   when an individual read request is received, determining in which one of the first memory bank and the second memory bank to first search for data requested by the individual read request based on whether the individual read request was received over the first data bus or the second data bus, and further based or whether a sticky bit is in a first state or a second state.

2. The bus-based cache memory system according to claim 1, wherein the one or more controllers are further configured to:
   when a first read request was received over the first data bus and when the first memory bank is configured to be the default memory bank for storing data requested by one or more of the read requests received over the first data bus, determine whether the first memory bank has the data requested by the first read request before determining whether the second memory bank has the data requested by the first read request, wherein the first read request is a first instance of the individual read request,
   when determined that the first memory bank does not have the data requested by the first read request, determine whether the second memory bank has the data requested by the first read request, and
   when determined that the second memory bank has the data requested by the first read request, return the data requested by the first read request to the processor from the second memory bank.

3. The bus-based cache memory system according to claim 2, wherein the one or more controllers are further configured to:
   when determined that the second memory bank has the data requested by the first read request, configure the second memory bank to be the default memory bank for storing data requested by one or more of the read requests received by the one or more cache controllers over the first data bus.

4. The bus-based cache memory system according to claim 3, wherein the one or more controllers are further configured to:
   after configuring the second memory bank to be the default memory bank for storing data requested by one or more of the read requests received by the one or more cache controllers over the first data bus, in response to receiving a second read request from the processor over the first data bus, determine whether the second memory bank has data requested by the second read request before determining whether the first memory bank has the data requested by the second read request, wherein the second read request is a second instance of the individual read request, and
   when determined that the second memory bank has the data requested by the second read request, return the data requested by the second read request to the processor from the second memory bank.

5. The bus-based cache memory system according to claim 2, wherein the data requested by the first read request is not duplicated or written to the first memory bank when determined that the second memory bank has the data requested by the first read request and that the first memory bank does not have the data requested by the first read request.

6. The bus-based cache memory system according to claim 1, wherein the one or more controllers are further configured to:
   when a first read request was received over the first data bus and when the first memory bank is configured to be the default memory bank for storing data requested by one or more of the read requests received over the first data bus, determine whether the first memory bank has data requested by the first read request before determining whether the second memory bank has the data requested by the first read request, wherein the first read request is a first instance of the individual read request, when determined that the first memory bank does not have the data requested by the first read request, determine whether the second memory bank has the data requested by the first read request, and when determined that the second memory bank does not have the data requested by the first read request, determine whether a memory having a longer access time than the first and second memory banks has the data requested by the first read request.

7. The bus-based cache memory system according to claim 1, wherein the one or more controllers are further configured to:

after receiving a first read request from the processor over the first data bus, wherein the first read request is a first instance of the individual read request, determine in which one of the first memory bank and the second memory bank to first search for data requested by the first read request further based on whether a sticky bit is in a first state or a second state, where the sticky bit is configured to be in the first state when the first memory bank is configured to be the default memory bank for storing data requested by one or more of the read requests received by the one or more cache controllers over the first data bus, and where the sticky bit is configured to be in the second state when the second memory bank is configured to be the default memory bank for storing data requested by one or more of the read requests received by the one or more cache controllers over the first data bus, when determined that the sticky bit is in the first state, determine whether the first memory bank has data requested by the first read request before determining whether the second memory bank has the data requested by the first read request, and when determined that the sticky bit is in the second state, determine whether the second memory bank has data requested by the first read request before determining whether the first memory bank has the data requested by the first read request.

8. The bus-based cache memory system according to claim 7, wherein the one or more controllers are further configured to:

determine that the sticky bit is in the first state, determine whether the first memory bank has data requested by the first read request before determining whether the second memory bank has the data requested by the first read request, determine that the first memory bank does not have the data requested by the first read request, determine that the second memory bank has the data requested by the first read request, return the data requested by the first read request to the processor from the second memory bank, and change a state of the sticky bit to the second state.

9. The bus-based cache memory system according to claim 8, wherein the one or more controllers are further configured to:

after receiving a second read request from the processor over the first data bus, wherein the second read request is a second instance of the individual read request, determine in which one of the first memory bank and the second memory bank to first search for data requested by the second read request further based on whether the sticky bit is in the first state or the second state to determine that the sticky bit is in the second state, determine whether the second memory bank has data requested by the second read request before determining whether the first memory bank has the data requested by the second read request, return the data requested by the second read request to the processor from the second memory bank upon determination that the second memory bank has data requested by the second read request, determine whether the first memory bank has data requested by the second read request upon determination that the second memory bank does not have data requested by the second read request, and change the state of the sticky bit to the first state upon determination that the first memory bank has data requested by the second read request.

10. The bus-based cache memory system according to claim 8, wherein:

the sticky bit corresponds to a memory address pointer usable for accessing a data buffer;

the memory address pointer is stored in a pointer register; and the one or more controllers are further configured to set the sticky bit to the first state if the pointer register is written to.

11. A method for providing dual-data cache access in reading data using a bus-based cache memory system, the bus-based data cache system comprising one or more cache controllers configured to receive read requests from a processor over a first data bus or over a second data bus, a first memory bank configured to be a default memory bank for storing data requested by one or more of the read requests received by the one or more cache controllers over a first one of the first data bus and the second data bus, and a second memory bank configured to be a default memory bank for storing data requested by one or more of the read requests received by the one or more cache controllers over a second one of the first data bus and the second data bus, the method comprising:

receiving a first read request from the processor;

determining in which one of the first memory bank and the second memory bank to first search for data requested by the first read request based on whether the first read request was received over the first data bus or the second data bus, and further based on whether a sticky bit is in a first state or a second state; and when the first read request was received from the processor over the first data bus and when the first memory bank is configured to be the default memory bank for storing data requested by one or more of the read requests received over the first data bus, determining whether the first memory bank has data requested by the first read request before determining whether the second memory bank has the data requested by the first read request.

12. The method according to claim 11, further comprising:

when determined that the first memory bank does not have the data requested by the first read request, determining whether the second memory bank has the data requested by the first read request; and when determined that the second memory bank has the data requested by the first read request, returning the data requested by the first read request to the processor from the second memory bank.

13. The method according to claim 12, further comprising:
when determined that the second memory bank has the data requested by the first read request, configuring the second memory bank to be the default memory bank for storing data requested by one or more of the read requests received by the one or more cache controllers over the first data bus;
receiving a second read request from the processor;
determining in which one of the first memory bank and the second memory bank to first search for data requested by the second read request based on whether the second read request was received over the first data bus or the second data bus;
when the second read request was received from the processor over the first data bus after configuring the second memory bank to be the default memory bank for storing data requested by one or more of the read requests received over the first data bus, determining whether the second memory bank has data requested by the second read request before determining whether the first memory bank has the data requested by the second read request; and
when determined that the second memory bank has the data requested by the second read request, returning the data requested by the second read request to the processor from the second memory bank.

14. The method according to claim 11, further comprising:
when determined that the first memory bank does not have the data requested by the first read request, determining whether the second memory bank has the data requested by the first read request; and
when determined that the second memory bank does not have the data requested by the first read request, determining whether a memory having longer access time than the first and second memory banks has the data requested by the first read request.

15. A method for providing dual-data cache access in reading data using a bus-based cache memory system, the bus-based data cache system comprising one or more cache controllers configured to receive read requests from a processor over a first data bus or over a second data bus, a first memory bank configured to be a default memory bank for storing data requested by one or more of the read requests received by the one or more cache controllers over a first one of the first data bus and the second data bus, and a second memory bank configured to be a default memory bank for storing data requested by one or more of the read requests received by the one or more cache controllers over a second one of the first data bus and the second data bus, the method comprising:
receiving a first read request from the processor;
determining in which one of the first memory bank and the second memory bank to first search for data requested by the first read request based on whether the first read request was received over the first data bus or the second data bus, and further based on whether a sticky bit is in a first state or a second state,
where the sticky bit is configured to be in the first state when the first memory bank is configured to be the default memory bank for storing data requested by one or more of the read requests received by the one or more cache controllers over the first data bus, and
where the sticky bit is configured to be in the second state when the second memory bank is configured to be the default memory bank for storing data requested by one or more of the read requests received by the one or more cache controllers over the first data bus;
when the first read request was received over the first data bus and when determined that the sticky bit is in the first state, determining whether the first memory bank has data requested by the first read request before determining whether the second memory bank has the data requested by the first read request; and
when the first read request was received over the first data bus and when determined that the sticky bit is in the second state, determining whether the second memory bank has data requested by the first read request before determining whether the first memory bank has the data requested by the first read request.

16. The method according to claim 15, wherein determining whether the sticky bit is in the first state or the second state includes determining that the sticky bit is in the first state, the method further comprising:
determining that the first memory bank does not have the data requested by the first read request;
determining that the second memory bank has the data requested by the first read request;
returning the data requested by the first read request to the processor from the second memory bank; and
changing a state of the sticky bit to the second state.

17. The method according to claim 16, further comprising:
receiving a second read request from the processor;
determining in which one of the first memory bank and the second memory bank to first search for data requested by the second read request based on whether the second read request was received over the first data bus or the second data bus, and further based on whether the sticky bit is in the first state or the second state;
when the second read request was received over the first data bus and when determined that the sticky bit is in the second state, determining whether the second memory bank has data requested by the second read request before determining whether the first memory bank has the data requested by the second read request.

18. The bus-based cache memory system according to claim 1, wherein the first memory bank and the second memory bank are memory banks of same level of memory.

19. The method according to claim 11, wherein the first memory bank and the second memory bank are memory banks of same level of memory.

20. The method according to claim 15, wherein the first memory bank and the second memory bank are memory banks of same level of memory.

* * * * *